US009753794B2

(12) United States Patent
Lan

(10) Patent No.: US 9,753,794 B2
(45) Date of Patent: Sep. 5, 2017

(54) METHOD AND APPARATUS FOR CONTROLLING SENDING OF HEARTBEAT SIGNAL

(71) Applicant: Huawei Technologies Co., Ltd., Shenzhen (CN)

(72) Inventor: Xiaohua Lan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 225 days.

(21) Appl. No.: 14/809,523

(22) Filed: Jul. 27, 2015

(65) Prior Publication Data

US 2015/0331739 A1 Nov. 19, 2015

Related U.S. Application Data

(63) Continuation of application No. PCT/CN2013/074797, filed on Apr. 26, 2013.

(51) Int. Cl.
*G06F 11/00* (2006.01)
*G06F 11/07* (2006.01)
(Continued)

(52) U.S. Cl.
CPC ...... *G06F 11/0757* (2013.01); *G06F 11/0709* (2013.01); *H04L 12/1859* (2013.01);
(Continued)

(58) Field of Classification Search
CPC ............ G06F 11/0709; G06F 11/0757; H04L 12/1859; H04L 12/1895; H04L 43/0858;
(Continued)

(56) References Cited

U.S. PATENT DOCUMENTS 9,277,049 B1 * 3/2016 Danis ............... H04M 3/42042
2007/0214256 A1 9/2007 Castaneda et al.
(Continued)

FOREIGN PATENT DOCUMENTS

CN 101115313 A 1/2008
CN 101699912 A 4/2010
(Continued)

OTHER PUBLICATIONS

Foreign Communication From A Counterpart Application, PCT Application No. PCT/CN2013/074797, English Translation of International Search Report dated Jan. 30, 2014, 3 pages.
(Continued)

Primary Examiner — Joshua P Lottich
(74) Attorney, Agent, or Firm — Conley Rose, P.C.

(57) ABSTRACT

A method and an apparatus for controlling sending of a heartbeat signal are provided. The method includes acquiring a target push delay corresponding to all target applications; sending the target push delay to a push server; receiving a first heartbeat signal control time sent by the push server and corresponding to the target push delay; and sending a heartbeat signal to the push server at an interval of the first heartbeat signal control time. According to the embodiments of the present invention, a first heartbeat signal control time may be determined according to an acquired target push delay corresponding to all target applications, and the first heartbeat signal control time may be adjusted according to a target application, so that a push client can send a heartbeat signal to a push server at an interval of the first heartbeat signal control time, to maintain a Push connection.

13 Claims, 4 Drawing Sheets

(51) Int. Cl.
*H04L 29/08* (2006.01)
*H04L 12/26* (2006.01)
*H04W 52/02* (2009.01)
*H04L 12/18* (2006.01)

(52) U.S. Cl.
CPC ...... *H04L 12/1895* (2013.01); *H04L 43/0858* (2013.01); *H04L 43/0864* (2013.01); *H04L 43/10* (2013.01); *H04L 67/26* (2013.01); *H04W 52/0222* (2013.01); *H04L 67/2895* (2013.01); *Y02B 60/46* (2013.01); *Y02B 60/50* (2013.01)

(58) Field of Classification Search
CPC ..... H04L 43/0864; H04L 43/10; H04L 67/26; H04W 52/0222
See application file for complete search history.

(56) References Cited

U.S. PATENT DOCUMENTS

| | | | |
|---|---|---|---|
| 2008/0165796 A1 | 7/2008 | Martinez et al. | |
| 2009/0158397 A1 | 6/2009 | Herzog et al. | |
| 2009/0305732 A1* | 12/2009 | Marcellino | H04L 12/587 455/466 |
| 2009/0307715 A1* | 12/2009 | Santamaria | G06F 9/4418 719/318 |
| 2012/0270579 A1 | 10/2012 | Seo et al. | |
| 2012/0290749 A1* | 11/2012 | Moench | G06F 9/445 710/63 |
| 2013/0103376 A1* | 4/2013 | Gaddam | H04L 67/26 703/13 |
| 2013/0111572 A1* | 5/2013 | Gaddam | H04W 12/06 726/7 |
| 2013/0151714 A1* | 6/2013 | Ralph | H04L 43/10 709/227 |
| 2013/0190032 A1* | 7/2013 | Li | H04L 67/28 455/517 |

FOREIGN PATENT DOCUMENTS

| | | |
|---|---|---|
| CN | 102523178 A | 6/2012 |
| CN | 102843250 A | 12/2012 |
| CN | 102932757 A | 2/2013 |
| EP | 2725740 A1 | 4/2014 |
| KR | 100725416 B1 | 5/2007 |
| WO | 2006077283 A1 | 7/2006 |

OTHER PUBLICATIONS

Foreign Communication From A Counterpart Application, PCT Application No. PCT/CN2013/074797, English Translation of Written Opinion dated Jan. 30, 2014, 12 pages.
Foreign Communication From A Counterpart Application, European Application No. 13883027.8, Extended European Search Report dated Feb. 4, 2016, 8 pages.

* cited by examiner

METHOD AND APPARATUS FOR CONTROLLING SENDING OF HEARTBEAT SIGNAL

CROSS-REFERENCE TO RELATED APPLICATIONS

This application is a continuation of International Application No. PCT/CN2013/074797, filed on Apr. 26, 2013, which is hereby incorporated by reference in its entirety.

TECHNICAL FIELD

The present invention relates to the communications field, and in particular, to a method and an apparatus for controlling sending of a heartbeat signal.

BACKGROUND

With the development of services, such as Internet, mobile network, digital television, and mobile multimedia broadcasting services, Push, which emerged earliest as a push instruction in the computer programming language, has developed to be a client/server mechanism-based technology in which a server proactively sends information to a client. Internet Protocol (IP) Push refers to an Hypertext Transfer Protocol (HTTP)-based technology in which a server pushes a message to a mobile device through an IP network.

To enable a server to push information to a mobile device in real time, a connection is established between the mobile device and the server. If there is no push message exchange for a long time, the connection may be disconnected, and consequently, the push message cannot be pushed to the mobile device in time. Therefore, to keep stability of the connection, the mobile device needs to send a heartbeat signal to the server at intervals, so as to keep the connection in an active state. In the prior art, after a connection is established between a mobile device and a server, the mobile device sends a heartbeat signal to the server at a fixed time interval, that is, the mobile device sends the heartbeat signal to the server at a fixed frequency. If a time interval for sending the heartbeat signal is too long, the connection may be disconnected due to interference, such as network quality or a firewall, causing that a push message cannot be pushed by the server to the mobile device in time. If the time interval for sending the heartbeat signal is too short, the mobile device needs to enable a network constantly, so as to send the heartbeat signal to the server, which increases battery power consumption of the mobile device and increases network traffic of the mobile device.

SUMMARY

Embodiments of the present invention provide a method and an apparatus for controlling sending of a heartbeat signal, so as to ensure stability of a Push connection and effectively reduce power consumption and network data traffic.

A first aspect of the embodiments of the present invention provides a method for controlling sending of a heartbeat signal, including acquiring a target push delay corresponding to all target applications; sending the target push delay to a push server; receiving a first heartbeat signal control time sent by the push server and corresponding to the target push delay; and sending a heartbeat signal to the push server at an interval of the first heartbeat signal control time.

In a first possible implementation manner of the first aspect, the acquiring a target push delay corresponding to all target applications includes, if a quantity of all the target applications is one, acquiring a push delay of the target application, and using the push delay of the target application as the target push delay; or if a quantity of all the target applications is at least two, acquiring push delays of all the target applications, and using a shortest push delay in all the push delays as the target push delay.

With reference to the first aspect or the first possible implementation manner of the first aspect, in a second possible implementation manner of the first aspect, after the sending a heartbeat signal to the push server at an interval of the first heartbeat signal control time, the method further includes, if it is detected that the heartbeat signal fails to be sent, reporting a sending failure rate to the push server; receiving a second heartbeat signal control time that is returned by the push server according to the sending failure rate and the target push delay, where the second heartbeat signal control time is shorter than the first heartbeat signal control time; and sending a heartbeat signal to the push server at an interval of the second heartbeat signal control time.

A second aspect of the embodiments of the present invention provides a method for controlling sending of a heartbeat signal, including receiving a target push delay sent by a push client and corresponding to all target applications; acquiring a first heartbeat signal control time corresponding to the target push delay; sending the first heartbeat signal control time to the push client; and receiving a heartbeat signal that is sent by the push client at an interval of the first heartbeat signal control time.

In a first possible implementation manner of the second aspect, after the receiving a heartbeat signal that is sent by the push client at an interval of the first heartbeat signal control time, the method further includes receiving a sending failure rate that is reported by the push client after detecting that the heartbeat signal fails to be sent; acquiring a second heartbeat signal control time that corresponds to the sending failure rate and the target push delay; sending the second heartbeat signal control time to the push client, where the second heartbeat signal control time is shorter than the first heartbeat signal control time; and receiving a heartbeat signal that is sent by the push client at an interval of the second heartbeat signal control time.

With reference to the second aspect or the first possible implementation manner of the second aspect, in a second possible implementation manner of the second aspect, the acquiring a first heartbeat signal control time corresponding to the target push delay includes acquiring the first heartbeat signal control time according to a network standard, a push success rate, and the target push delay, where the first heartbeat signal control time is a longest heartbeat signal control time, corresponding to the target push delay, in a current network standard and when a preset push success rate is met.

With reference to the first possible implementation manner of the second aspect, in a third possible implementation manner of the second aspect, the acquiring a second heartbeat signal control time that corresponds to the sending failure rate and the target push delay includes acquiring the second heartbeat signal control time according to a network standard, a push success rate, the sending failure rate, and the target push delay, where the second heartbeat signal control time is a longest heartbeat signal control time, corresponding to the sending failure rate and the target push delay, in a current network standard and when a preset push success rate is met.

A third aspect of the embodiments of the present invention provides an apparatus for controlling sending of a heartbeat signal, including a target push delay acquiring module configured to acquire a target push delay corresponding to all target applications; a target push delay sending module configured to send the target push delay acquired by the target push delay acquiring module to a push server; a first receiving module configured to receive a corresponding first heartbeat signal control time that is returned by the push server according to the received target push delay sent by the target push delay sending module; and a first heartbeat-signal sending module configured to send a heartbeat signal to the push server at an interval of the first heartbeat signal control time according to the first heartbeat signal control time received by the first receiving module.

In a first possible implementation manner of the third aspect, the target push delay acquiring module includes a first acquiring unit configured to, when a quantity of all the target applications is one, acquire a push delay of the target application, and use the push delay of the target application as the target push delay; and a second acquiring unit configured to, when a quantity of all the target applications is at least two, acquire push delays of all the target applications, and use a shortest push delay in all the push delays as the target push delay.

With reference to the third aspect or the first possible implementation manner of the third aspect, in a second possible implementation manner of the third aspect, the apparatus further includes a sending failure rate reporting module configured to, when detecting that the heartbeat signal fails to be sent, report a sending failure rate to the push server; a second receiving module configured to receive a second heartbeat signal control time that is returned by the push server according to the sending failure rate reported by the sending failure rate reporting module and the target push delay sent by the target push delay sending module, where the second heartbeat signal control time is shorter than the first heartbeat signal control time; and a second heartbeat-signal sending module configured to send a heartbeat signal to the push server at an interval of the second heartbeat signal control time according to the second heartbeat signal control time received by the second receiving module.

A fourth aspect of the embodiments of the present invention provides an apparatus for controlling sending of a heartbeat signal, including a target push delay receiving module configured to receive a target push delay sent by a push client and corresponding to all target applications; a first-heartbeat-signal-control-time acquiring module configured to acquire a first heartbeat signal control time corresponding to the target push delay received by the target push delay receiving module; a first sending module configured to send the first heartbeat signal control time acquired by the first-heartbeat-signal-control-time acquiring module to the push client; and a first heartbeat-signal receiving module configured to receive a heartbeat signal that is sent by the push client at an interval of the first heartbeat signal control time according to the received first heartbeat signal control time sent by the first sending module.

In a first possible implementation manner of the fourth aspect, the apparatus further includes a sending failure rate receiving module configured to receive a sending failure rate that is reported by the push client after detecting that the heartbeat signal fails to be sent; a second-heartbeat-signal-control-time acquiring module configured to acquire a second heartbeat signal control time that corresponds to the sending failure rate received by the sending failure rate receiving module and the target push delay received by the target push delay receiving module; a second sending module configured to send the second heartbeat signal control time acquired by the second-heartbeat-signal-control-time acquiring module to the push client, where the second heartbeat signal control time is shorter than the first heartbeat signal control time; and a second heartbeat-signal receiving module configured to receive a heartbeat signal that is sent by the push client at an interval of the second heartbeat signal control time according to the received second heartbeat signal control time sent by the second sending module.

With reference to the fourth aspect or the first possible implementation manner of the fourth aspect, in a second possible implementation manner of the fourth aspect, when the first-heartbeat-signal-control-time acquiring module acquires the first heartbeat signal control time corresponding to the target push delay, the first-heartbeat-signal-control-time acquiring module is configured to acquire the first heartbeat signal control time according to a network standard, a push success rate, and the target push delay, where the first heartbeat signal control time is a longest heartbeat signal control time, corresponding to the target push delay, in a current network standard and when a preset push success rate is met.

With reference to the first possible implementation manner of the fourth aspect, in a third possible implementation manner of the fourth aspect, when the second-heartbeat-signal-control-time acquiring module acquires the second heartbeat signal control time that corresponds to the sending failure rate and the target push delay, the second-heartbeat-signal-control-time acquiring module is configured to acquire the second heartbeat signal control time according to a network standard, a push success rate, the sending failure rate, and the target push delay, where the second heartbeat signal control time is a longest heartbeat signal control time, corresponding to the sending failure rate and the target push delay, in a current network standard and when a preset push success rate is met.

A fifth aspect of the embodiments of the present invention provides a terminal, including a first processor, a first receiver, and a first sender, where the first processor is configured to acquire a target push delay corresponding to all target applications; the first sender, connected to the processor, is configured to send the target push delay to a push server; and the first receiver, connected to the first processor, is configured to receive a first heartbeat signal control time sent by the push server and corresponding to the target push delay, where the first processor is further configured to send a heartbeat signal to the push server through the first sender at an interval of the first heartbeat signal control time.

In a first possible implementation manner of the fifth aspect, when the first processor acquires the target push delay corresponding to all the target applications, the first processor is configured to, if a quantity of all the target applications is one, acquire a push delay of the target application, and use the push delay of the target application as the target push delay; or if a quantity of all the target applications is at least two, acquire push delays of all the target applications, and use a shortest push delay in all the push delays as the target push delay.

With reference to the fifth aspect or the first possible implementation manner of the fifth aspect, in a second possible implementation manner of the fifth aspect, the first processor is further configured to, after sending the heartbeat signal to the push server through the first sender at an interval of the first heartbeat signal control time, if detecting that the heartbeat signal fails to be sent, report a sending failure rate to the push server through the first sender; the first receiver is further configured to receive a second heartbeat signal control time that is returned by the push server according to the sending failure rate and the target push delay, where the second heartbeat signal control time is shorter than the first heartbeat signal control time; and the first processor is further configured to send a heartbeat signal to the push server through the first sender at an interval of the second heartbeat signal control time.

A sixth aspect of the embodiments of the present invention provides a server, including a second processor, a second receiver, and a second sender, where the second receiver is configured to receive a target push delay sent by a push client and corresponding to all target applications; the second processor, connected to the second receiver, is configured to acquire a first heartbeat signal control time corresponding to the target push delay; and the second sender, connected to the second processor, is configured to send the first heartbeat signal control time to the push client, where the second receiver is further configured to receive a heartbeat signal that is sent by the push client at an interval of the first heartbeat signal control time.

In a first possible implementation manner of the sixth aspect, the second receiver is further configured to receive a sending failure rate that is reported by the push client after detecting that the heartbeat signal fails to be sent; the second processor is further configured to acquire a second heartbeat signal control time that corresponds to the sending failure rate and the target push delay; the second sender is further configured to send the second heartbeat signal control time to the push client, where the second heartbeat signal control time is shorter than the first heartbeat signal control time; and the second receiver is further configured to receive a heartbeat signal that is sent by the push client at an interval of the second heartbeat signal control time.

With reference to the sixth aspect or the first possible implementation manner of the sixth aspect, in a second possible implementation manner of the sixth aspect, when the second processor acquires the first heartbeat signal control time corresponding to the target push delay, the second processor is configured to acquire the first heartbeat signal control time according to a network standard, a push success rate, and the target push delay, where the first heartbeat signal control time is a longest heartbeat signal control time, corresponding to the target push delay, in a current network standard and when a preset push success rate is met.

With reference to the first possible implementation manner of the sixth aspect, in a third possible implementation manner of the sixth aspect, when the second processor acquires the second heartbeat signal control time that corresponds to the sending failure rate and the target push delay, the second processor is configured to acquire the second heartbeat signal control time according to a network standard, a push success rate, the sending failure rate, and the target push delay, where the second heartbeat signal control time is a longest heartbeat signal control time, corresponding to the sending failure rate and the target push delay, in a current network standard and when a preset push success rate is met.

According to the embodiments of the present invention, a first heartbeat signal control time can be determined according to an acquired target push delay corresponding to all target applications, and the first heartbeat signal control time can be adjusted according to a target application, so that a push client can send a heartbeat signal to a push server at an interval of the first heartbeat signal control time, thereby ensuring stability of a Push connection, and effectively reducing power consumption and network data traffic.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

Figure 1:
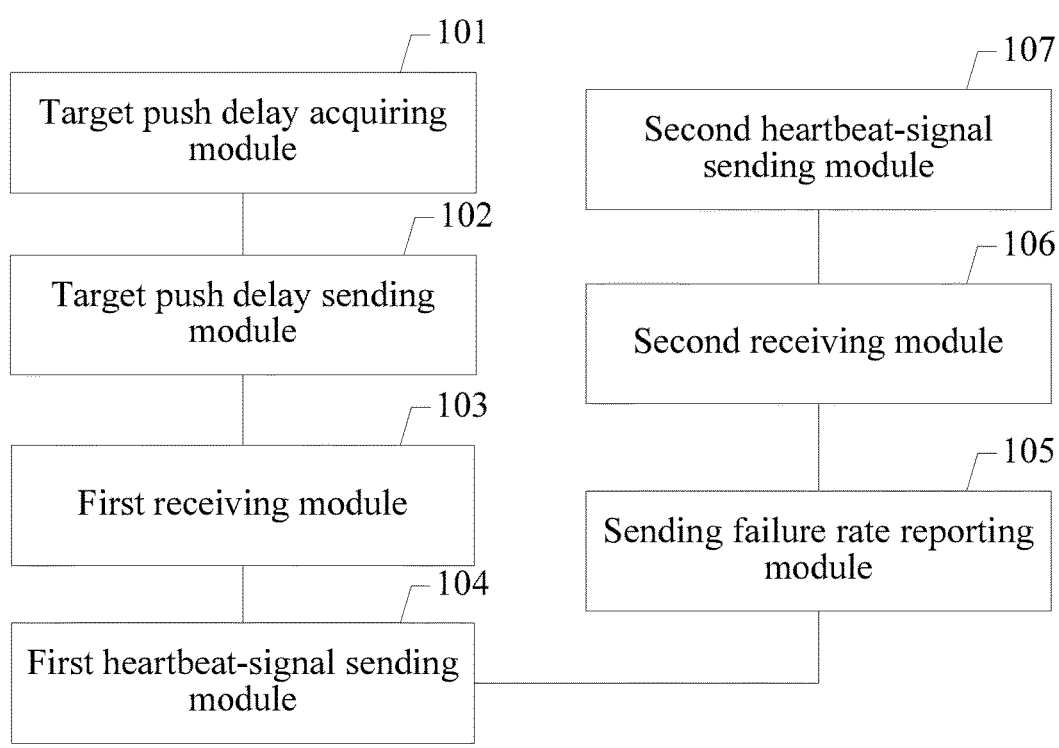
FIG. 1 is a schematic structural diagram of an apparatus for controlling sending of a heartbeat signal according to an embodiment of the present invention.

To make the objectives, technical solutions, and advantages of the present invention clearer and more comprehensible, the following further describes the present invention in detail with reference to the accompanying drawings and embodiments.

According to a method and an apparatus for controlling sending of a heartbeat signal provided by embodiments of the present invention, a push client acquires a target push delay corresponding to all target applications; the push client sends the target push delay to a push server; the push server receives the target push delay sent by the push client and corresponding to all the target applications; the push server acquires a first heartbeat signal control time corresponding to the target push delay; the push server sends the first heartbeat signal control time to the push client; the push client receives the first heartbeat signal control time; and the push client sends a heartbeat signal to the push server at an interval of the first heartbeat signal control time. A heartbeat signal control time can be adjusted according to a target application, so that the push client can send a heartbeat signal to the push server at an interval of the heartbeat signal control time, which ensures stability of a Push connection, thereby further improving timeliness of push message pushing and enhancing user experience. Furthermore, because a length of the heartbeat signal control time can be adjusted according to the target application, unnecessary power consumption and network data traffic can be reduced.

The push server refers to a server that can provide a Push service. The Push server is connected to the Push client through an IP network, for example, a Transmission Control Protocol (TCP) connection may be established between the Push client and the Push server. To keep stability of the connection, the Push client sends a heartbeat signal to the Push server at intervals, to keep the connection in an active state and keep the stability of the Push connection. The Push server may push a message to the Push client at any time by using the Push connection.

The push client refers to a terminal that subscribes to a Push service during network registration, such as a mobile phone, a tablet computer, a digital television terminal, or a set top box. The Push client includes a Push proxy and at least one target application. The target application may be an application program that is included in the push client and that successfully registers application information with the Push proxy, where the registered application information includes a target application name and a push-acceptable signal delay. The target application may be, for example, a telephone application of a mobile phone that successfully registers application information with the Push proxy, a game application of a tablet computer that successfully registers application information with the Push proxy, or a finance application of a digital television that successfully registers application information with the Push proxy, that is, the target application is an application program that can receive a Push message. The Push proxy is a communication proxy that is used as a proxy for the target application to send a target push delay, a heartbeat signal, or the like, to the push server, or is used as a proxy for the target application to receive a push message, a target push delay, or the like, from the push server.

After the connection is established between the Push server and the Push client, the application program needs to apply to the Push server for registration, and after the registration succeeds, the Push server may receive a heartbeat signal sent by the Push client, or send a push message to the target application. The target application applies to the Push server for a push target address identifier, where the push target address identifier is a unique identifier of a Push target address and is used to identify to which application of a specific device of the client a message is pushed. Steps for the application program to apply to the Push server for registration are as follows.

The application program sends registration application information to the Push proxy, where the registration application information includes an application program name and a push-acceptable heartbeat signal delay, and the push-acceptable heartbeat signal delay is a time period, such as 30 seconds, 2400 seconds, or 3600 seconds.

After receiving the registration application information, the Push proxy sends corresponding registration request information to the Push server, where the registration request information includes a unique device identifier, the application program name, and the push-acceptable heartbeat signal delay, where the unique device identifier is a device code used to identify a device of the Push client, for example, an International Mobile Equipment Identity (IMEI), which is a globally unique electronic serial number granted to each mobile phone after assembling is completed.

After receiving the registration request information, the Push server generates a corresponding push target address identifier, and returns the generated push target address identifier to the Push proxy.

After receiving the push target address identifier returned by the Push server, the Push proxy returns the push target address identifier to the application program, where the application program that successfully registers the application information with the Push proxy is the target application.

Referring to FIG. 1, FIG. 1 is a schematic structural diagram of an apparatus for controlling sending of a heartbeat signal according to an embodiment of the present invention. The apparatus for controlling sending of a heartbeat signal may be a push client. As shown in FIG. 1, the apparatus for controlling sending of a heartbeat signal at least includes a target push delay acquiring module 101, a target push delay sending module 102, a first receiving module 103, and a first heartbeat-signal sending module 104.

The target push delay acquiring module 101 is configured to acquire a target push delay corresponding to all target applications. In a specific implementation, when a Push connection is established or a target application is installed or uninstalled, the target push delay acquiring module 101 in the Push client acquires the target push delay corresponding to all the target applications. Further, optionally, the target push delay acquiring module 101 may include a first acquiring unit and a second acquiring unit, where the first acquiring unit is configured to, when a quantity of all the target applications is one, acquire a push delay of the target application, and use the push delay of the target application as the target push delay; and the second acquiring unit is configured to, when a quantity of all the target applications is at least two, acquire push delays of all the target applications, and use a shortest push delay in all the push delays as the target push delay.

Optionally, after a push delay attribute parameter of a target application is read, a push delay of the target application is obtained, that is, each target application corresponds to one push delay attribute parameter, and each target application corresponds to one push delay. Push delay attribute parameters of all the target applications in the push client are read. If there is only one target application, the first acquiring unit acquires a push delay of the target application, and uses the acquired push delay of the target application as the target push delay; if there are multiple target applications, the second acquiring unit acquires push delays of all the target applications, and performs comparison to obtain a shortest push delay as the target push delay.

The target application may write the push delay attribute parameter into a static configuration file, where the push delay attribute parameter indicates a heartbeat signal delay range acceptable to the target application, and may be an editable time length in seconds. For example, a push delay attribute parameter of 60 seconds can be written into an ANDROID device by using the following statements, that is, by adding the following content to a manifest.xml file in an application package in the ANDROID device.

```
<meta-data
android:name="PushDeviateSecond"
android:value="60" >
</meta-data>
```

A PushDeviateSecond attribute value in a configuration file of at least one target application is read to obtain a push delay of the target application. For example, in an ANDROID device, a Push client acquires, through an operating system interface, a PushDeviateSecond attribute value of meta-data in a configuration file of a target application.

When there are at least two target applications, push delays of all the target applications are acquired, and a shortest push delay in all the push delays is used as the target push delay. For example, push delays that are obtained by reading push delay attribute parameters configured by four target applications and that correspond to all the target applications are as follows: a push delay of a target application A is 30 seconds, a push delay of a target application B is 90 seconds, a push delay of a target application C is 300 seconds, and a push delay of a target application D is 3600 seconds; then, a shortest push delay, obtained by comparison, is 30 seconds, and therefore, a target push delay acquired by the target push delay acquiring module 101 is 30 seconds.

The target push delay sending module 102 is configured to send the target push delay acquired by the target push delay acquiring module 101 to a push server. In a specific implementation, the target push delay acquired by the target push delay acquiring module 101 is sent to the Push server, and an information format of the target push delay is as follows.

| 4-bit version | 4-bit header length | 8-bit type of service (TOS) | 16-bit total length (quantity of bytes) |
|---|---|---|---|
| | 16-bit identifier | | 3-bit flag  13-bit fragment offset |
| 8-bit time to live (TTL) | | 8-bit protocol | 16-bit header checksum |
| 32-bit source IP address | | | |
| 32-bit destination IP address | | | |
| 32-bit PushDeviateSecond value | | | |

The first receiving module 103 is configured to receive a corresponding first heartbeat signal control time that is returned by the push server according to the received target push delay sent by the target push delay sending module 102.

The first heartbeat-signal sending module 104 is configured to send a heartbeat signal to the push server at an interval of the first heartbeat signal control time according to the first heartbeat signal control time received by the first receiving module 103. In a specific implementation, the first heartbeat-signal sending module 104 sends the heartbeat signal to the push server at an interval of the first heartbeat signal control time to maintain a connection; for example, the first heartbeat-signal sending module 104 sends, according to a received first heartbeat signal control time of 60 seconds, a heartbeat signal to the push server at an interval of 60 seconds.

Further, optionally, the apparatus for controlling sending of a heartbeat signal in this embodiment of the present invention may further include a sending failure rate reporting module 105, a second receiving module 106, and a second heartbeat-signal sending module 107.

The sending failure rate reporting module 105 is configured to report a sending failure rate to the push server when detecting that the heartbeat signal fails to be sent. In a specific implementation, when detecting that the heartbeat signal fails to be sent, the push client reports the sending failure rate to the push server, where the sending failure rate is a quantity of heartbeat signal sending failures within a preset time. In a heartbeat signal sending process, heartbeat signal sending may fail if the heartbeat signal is lost or times out, or heartbeat signal sending may also fail if a connection is disconnected due to poor network quality. When the heartbeat signal sending fails, the push client may receive a heartbeat signal sending failure response, and further detects the heartbeat signal sending failure. For example, a format of the sending failure rate reported to the Push server is as follows.

| 4-bit version | 4-bit header length | 8-bit type of service (TOS) | 16-bit total length (quantity of bytes) |
|---|---|---|---|
| | 16-bit identifier | | 3-bit flag  13-bit fragment offset |
| 8-bit time to live (TTL) | | 8-bit protocol | 16-bit header checksum |
| 32-bit source IP address | | | |
| 32-bit destination IP address | | | |
| 32-bit signal sending failure rate | | | |
| 32-bit network standard type | | | |

The second receiving module 106 is configured to receive a second heartbeat signal control time that is returned by the push server according to the sending failure rate reported by the sending failure rate reporting module 105 and the target push delay sent by the target push delay sending module 102, where the second heartbeat signal control time is shorter than the first heartbeat signal control time. The push server returns the acquired second heartbeat signal control time to the push client, and the second receiving module 106 of the push client receives the second heartbeat signal control time returned by the push server.

The second heartbeat-signal sending module 107 is configured to send a heartbeat signal to the push server at an interval of the second heartbeat signal control time according to the second heartbeat signal control time received by the second receiving module 106. In a specific implementation, the second heartbeat-signal sending module 107 sends the heartbeat signal to the push server at an interval of the second heartbeat signal control time to maintain a connection. For example, the second heartbeat-signal sending module 107 sends, according to a received second heartbeat signal control time of 45 seconds, a heartbeat signal to the Push server at an interval of 45 seconds. The second heartbeat signal control time is a heartbeat signal control time that is re-adjusted after a previous heartbeat signal sending failure, thereby maintaining a Push connection and ensuring stability of the connection when heartbeat signal sending fails due to heartbeat signal loss or timeout, poor network quality, or the like.

The apparatus for controlling sending of a heartbeat signal provided by this embodiment of the present invention may determine a first heartbeat signal control time according to an acquired target push delay corresponding to all target applications, and the first heartbeat signal control time may be adjusted according to a target application, so that a push client can send a heartbeat signal to a push server at an interval of the first heartbeat signal control time; and when heartbeat signal sending fails due to network quality, signal loss, or the like, the push client may further send a heartbeat signal to the Push server according to a received second heartbeat signal control time returned by the push server; further, a heartbeat signal control time may be adjusted according to network quality or the like, thereby ensuring stability of a Push connection, and further improving timeliness of push message pushing, enhancing user experience, and effectively reducing power consumption and network data traffic.

Figure 2:
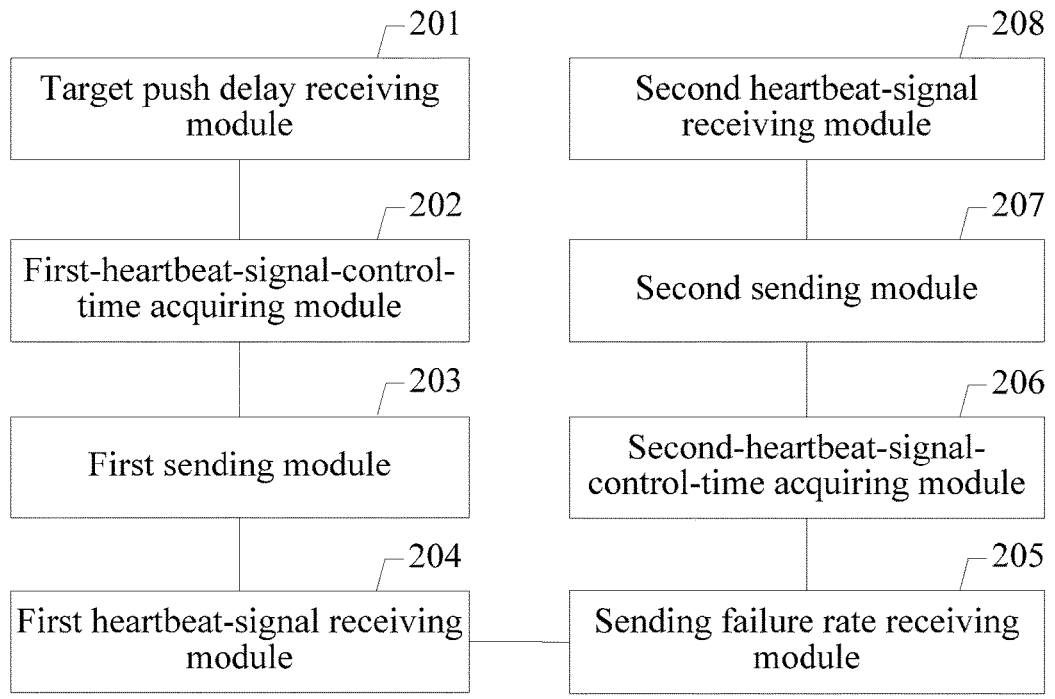
FIG. 2 is a schematic structural diagram of another apparatus for controlling sending of a heartbeat signal according to an embodiment of the present invention.

Referring to FIG. 2, FIG. 2 is a schematic structural diagram of another apparatus for controlling sending of a heartbeat signal according to an embodiment of the present invention. The apparatus for controlling sending of a heartbeat signal may be a push server. As shown in FIG. 2, the apparatus for controlling sending of a heartbeat signal at least includes a target push delay receiving module 201, a first-heartbeat-signal-control-time acquiring module 202, a first sending module 203, and a first heartbeat-signal receiving module 204.

The target push delay receiving module 201 is configured to receive a target push delay sent by a push client and corresponding to all target applications. In a specific implementation, the target push delay receiving module 201 receives the target push delay sent by the push client and corresponding to all the target applications.

The first-heartbeat-signal-control-time acquiring module 202 is configured to acquire a first heartbeat signal control time corresponding to the target push delay received by the target push delay receiving module 201. In a specific implementation, when the first-heartbeat-signal-control-time acquiring module 202 of the push server acquires the first heartbeat signal control time corresponding to the target push delay, the first-heartbeat-signal-control-time acquiring module 202 is configured to acquire the first heartbeat signal control time according to a network standard, a push success rate, and the target push delay, where the first heartbeat signal control time is a longest heartbeat signal control time, corresponding to the target push delay, in a current network standard and when a preset push success rate is met.

The push success rate is statistical data that is pre-collected on different target applications by the push server in different network standards, where the data corresponds to a push delay and a heartbeat signal control time of a target application. For example, statistical data in the push server may be a chart, where, in this chart, a coordinate system is established by using the push delay and the heartbeat signal control time of the target application as a horizontal axis and a vertical axis respectively, and a corresponding coordinate point is the push success rate. When receiving the target push delay, the push server finds a corresponding longest heartbeat signal control time in the coordinate system according to the target push delay and a preset push success rate, and acquires the heartbeat signal control time as the first heartbeat signal control time. For example, a push delay of a target application A is 30 seconds, a push delay of a target application B is 45 seconds, a push delay of a target application C is 60 seconds, a target push delay corresponding to the target applications A, B, and C is 30 seconds, and a preset push success rate is 99.9 percent (%), a longest heartbeat signal control time corresponding to the push delay of 30 seconds and the push success rate of 99.9% is searched for in the chart, and the longest heartbeat signal control time of 60 seconds is found, and then, 60 seconds are determined as the first heartbeat signal control time.

The first sending module 203 is configured to send the first heartbeat signal control time acquired by the first-heartbeat-signal-control-time acquiring module 202 to the push client. In a specific implementation, the first sending module 203 of the push server sends the first heartbeat signal control time acquired by the first-heartbeat-signal-control-time acquiring module 202 to the push client. For example, a format of the first heartbeat signal control time sent to the push client is as follows.

| 4-bit version | 4-bit header length | 8-bit type of service (TOS) | 16-bit total length (quantity of bytes) |
|---|---|---|---|
| | 16-bit identifier | | 3-bit flag  13-bit fragment offset |
| 8-bit time to live (TTL) | | 8-bit protocol | 16-bit header checksum |

-continued

| |
|---|
| 32-bit source IP address |
| 32-bit destination IP address |
| 32-bit signal time interval |

The first heartbeat-signal receiving module 204 is configured to receive a heartbeat signal that is sent by the push client at an interval of the first heartbeat signal control time according to the received first heartbeat signal control time sent by the first sending module. In a specific implementation, after receiving the first heartbeat signal control time sent by the first sending module 203, the push client sends the heartbeat signal to the push server at an interval of the first heartbeat signal control time, and the push server receives the heartbeat signal sent by the push client, so as to maintain a Push connection.

Further, optionally, the apparatus for controlling sending of a heartbeat signal in this embodiment of the present invention may further include a sending failure rate receiving module 205, a second-heartbeat-signal-control-time acquiring module 206, a second sending module 207, and a second heartbeat-signal receiving module 208.

The sending failure rate receiving module 205 is configured to receive a sending failure rate that is reported by the push client after detecting that the heartbeat signal fails to be sent. In a specific implementation, when detecting that the heartbeat signal fails to be sent, the push client reports the sending failure rate to the Push server, and the push server receives the sending failure rate. In a heartbeat signal sending process, heartbeat signal sending may fail if the heartbeat signal is lost or times out, or heartbeat signal sending may also fail if a connection is disconnected due to poor network quality. When the heartbeat signal sending fails, the push client may receive a heartbeat signal sending failure response.

The second-heartbeat-signal-control-time acquiring module 206 is configured to acquire a second heartbeat signal control time that corresponds to the sending failure rate received by the sending failure rate receiving module 205 and the target push delay received by the target push delay receiving module 201. In a specific implementation, when the second-heartbeat-signal-control-time acquiring module 206 acquires the second heartbeat signal control time that corresponds to the sending failure rate and the target push delay, the second-heartbeat-signal-control-time acquiring module 206 is configured to acquire the second heartbeat signal control time according to a network standard, a push success rate, the sending failure rate, and the target push delay, where the second heartbeat signal control time is a longest heartbeat signal control time, corresponding to the sending failure rate and the target push delay, in a current network standard and when a preset push success rate is met.

The push success rate is statistical data that is pre-collected on different target applications by the push server in different network standards, where the data corresponds to a push delay and a heartbeat signal control time of a target application, and may be recorded and measured in a form of a chart. For example, for statistical data in the push server in the case of poor network quality, a coordinate system is established by using the push delay and the heartbeat signal control time of the target application as a horizontal axis and a vertical axis respectively, and a corresponding coordinate point is the push success rate. When receiving the target push delay, the push server finds a corresponding longest heartbeat signal control time in the coordinate system according to the target push delay and the preset push success rate; combined with the sending failure rate, multiplies the found heartbeat signal control time by a proportionality coefficient to obtain the second heartbeat signal control time, where the proportionality coefficient is a preset proportionality coefficient corresponding to the sending failure rate, and a correspondence is as follows: a higher sending failure rate indicates a lower preset proportionality coefficient, and a lower sending failure rate indicates a higher preset proportionality coefficient; and multiplies the found heartbeat signal control time by the proportionality coefficient to obtain the second heartbeat signal control time, where the second heartbeat signal control time is shorter than the first heartbeat signal control time. For example, a push delay of a target application A is 30 seconds, a push delay of a target application B is 45 seconds, a push delay of a target application C is 60 seconds, a target push delay is 30 seconds, a preset push success rate is 99.9%, a corresponding first heartbeat signal control time found in the chart is 40 seconds, a received sending failure rate is 5%, and a corresponding preset proportionality coefficient is ¾; then, a second heartbeat signal control time is: 40*¾=30 seconds.

It should be noted that this embodiment of the present invention does not limit a specific correspondence between the sending failure rate and the proportionality coefficient; a form of statistical data in the case of poor network quality and a form of statistical data in the case of normal network quality may be the same, but specific numeric values may be different; the form of the statistical data is not limited to a chart; and the statistical data may be updated periodically according to an actual situation.

The second sending module 207 is configured to send the second heartbeat signal control time acquired by the second-heartbeat-signal-control-time acquiring module 206 to the push client, where the second heartbeat signal control time is shorter than the first heartbeat signal control time. In a specific implementation, the second heartbeat signal control time acquired by the second-heartbeat-signal-control-time acquiring module 206 is sent to the push client, where a format of the second heartbeat signal control time sent to the push client is as follows.

| 4-bit version | 4-bit header length | 8-bit type of service (TOS) | 16-bit total length (quantity of bytes) |
|---|---|---|---|
| | 16-bit identifier | | 3-bit flag  13-bit fragment offset |
| 8-bit time to live (TTL) | | 8-bit protocol | 16-bit header checksum |
| | | 32-bit source IP address | |
| | | 32-bit destination IP address | |
| | | 32-bit signal time interval | |

The second heartbeat-signal receiving module 208 is configured to receive a heartbeat signal that is sent by the push client at an interval of the second heartbeat signal control time according to the received second heartbeat signal control time sent by the second sending module 207. In a specific implementation, the second heartbeat-signal receiving module 208 receives the heartbeat signal that is sent by the push client at an interval of the second heartbeat signal control time, so as to maintain a connection, where the second heartbeat signal control time is a heartbeat signal control time that is re-adjusted after a previous heartbeat signal sending failure, thereby maintaining a Push connection and ensuring stability of the connection when heartbeat signal sending fails due to heartbeat signal loss or timeout, poor network quality, or the like.

The apparatus for controlling sending of a heartbeat signal provided by this embodiment of the present invention may acquire a first heartbeat signal control time according to a received target push delay corresponding to all target applications, and the first heartbeat signal control time may be adjusted according to a target application, so that a heartbeat signal sent by a push client at an interval of the first heartbeat signal control time is received; and when the heartbeat signal fails to be sent due to network quality, signal loss, or the like, a push server may further return a second heartbeat signal control time according to a sending failure rate and a target push delay, so as to receive a heartbeat signal that is sent by the push client at an interval of the second heartbeat signal control time; further, the heartbeat signal control time may be adjusted according to network quality, or the like, thereby ensuring stability of a Push connection, and further improving timeliness of push message pushing, enhancing user experience, and effectively reducing power consumption and network data traffic.

Figure 3:
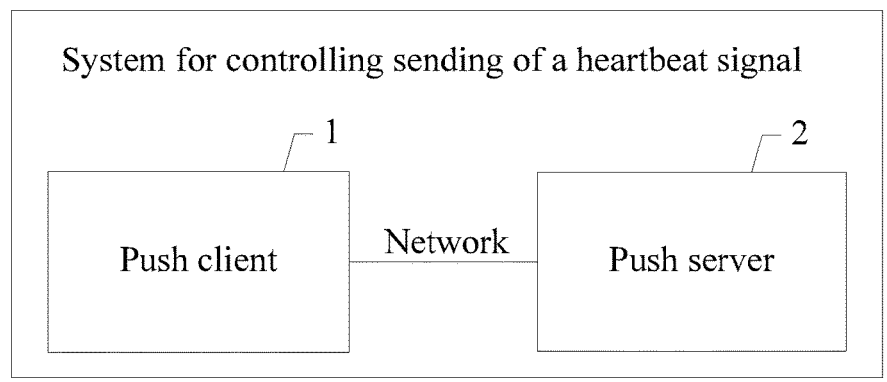
FIG. 3 is a schematic structural diagram of a system for controlling sending of a heartbeat signal according to an embodiment of the present invention.

Referring to FIG. 3, FIG. 3 is a schematic structural diagram of a system for controlling sending of a heartbeat signal according to an embodiment of the present invention. As shown in FIG. 3, the system includes a push client 1 and a push server 2, where the push client 1 and the push server 2 are connected through an IP network; the push client refers to a terminal that subscribes to a Push service during network registration, for example, a device such as a mobile phone, a tablet computer, a digital television terminal, a set top box, or the like, and the push client includes a Push proxy and at least one target application, where the target application may be, for example, a telephone application of a mobile phone, a game application of a tablet computer, or a finance application of a digital television; each device may have one Push proxy and at least one target application; and the push client may include at least one device.

The push client 1, such as the apparatus described in the foregoing embodiment corresponding to FIG. 1, is configured to acquire a target push delay corresponding to all target applications; send the target push delay to the push server 2; receive a first heartbeat signal control time sent by the push server and corresponding to the target push delay; and send a heartbeat signal to the push server at an interval of the first heartbeat signal control time.

The push server 2, such as the apparatus described in the foregoing embodiment corresponding to FIG. 2, is configured to receive the target push delay sent by the push client 1 and corresponding to all the target applications; acquire the first heartbeat signal control time corresponding to the target push delay; send the first heartbeat signal control time to the push client; and receive the heartbeat signal sent by the push client at an interval of the first heartbeat signal control time.

The following illustrates a specific implementation of a method for controlling sending of a heartbeat signal provided by an embodiment of the present invention.

Figure 4:
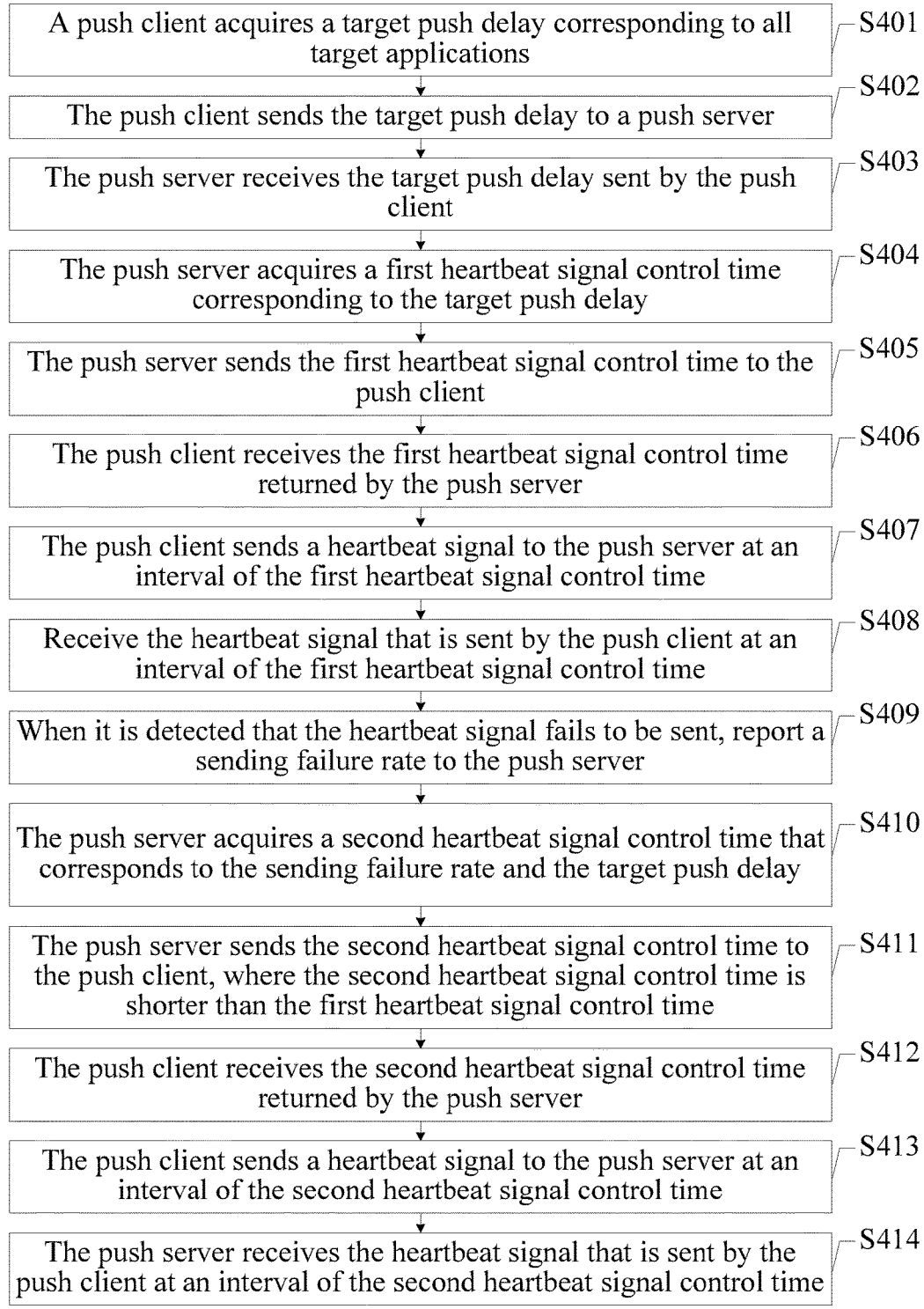
FIG. 4 is a flowchart of a method for controlling sending of a heartbeat signal according to an embodiment of the present invention.

FIG. 4 is a flowchart of the method for controlling sending of a heartbeat signal according to this embodiment of the present invention. As shown in the figure, the method for controlling sending of a heartbeat signal at least includes the following steps.

Step S401. A push client acquires a target push delay corresponding to all target applications. In a specific implementation, when a Push connection is established or a target application is installed or uninstalled, the Push client acquires the target push delay corresponding to all the target applications, where the acquiring a target push delay corresponding to all target applications may include, if a quantity of all the target applications is one, acquiring a push delay of the target application, and using the push delay of the target application as the target push delay; or if a quantity of all the target applications is at least two, acquiring push delays of all the target applications, and using a shortest push delay in all the push delays as the target push delay.

Optionally, after a push delay attribute parameter of a target application is read, a push delay of the target application is obtained, that is, each target application corresponds to one push delay attribute parameter, and each target application corresponds to one push delay. Push delay attribute parameters of all the target applications in the push client are read. If there is only one target application, a push delay of the target application is acquired, and the acquired push delay of the target application is used as the target push delay; if there are multiple target applications, push delays of all the target applications are acquired, and comparison is performed to obtain a shortest push delay as the target push delay.

The target application may write the push delay attribute parameter into a static configuration file, where the push delay attribute parameter indicates a heartbeat signal delay range acceptable to the target application, and may be an editable time length in seconds. For example, a push delay attribute parameter of 60 seconds can be written into an ANDROID device by using the following statements, that is, by adding the following content to a manifest.xml file in an application package in the ANDROID device.

```
<meta-data
  android:name="PushDeviateSecond"
  android:value="60" >
</meta-data>
```

A push delay attribute parameter configured by at least one target application is read to obtain a push delay of the target application, that is, a PushDeviateSecond attribute value in a configuration file of the at least one target application is read. For example, in the ANDROID device, the Push client acquires the PushDeviateSecond attribute value of meta-data in the configuration file of the target application by using an operating system interface.

When there are at least two target applications, push delays of all the target applications are acquired, and a shortest push delay in all the push delays is used as the target push delay. For example, push delays that are obtained by reading push delay attribute parameters configured by four target applications and that correspond to all the target applications are as follows: a push delay of a target application A is 30 seconds, a push delay of a target application B is 90 seconds, a push delay of a target application C is 300 seconds, and a push delay of a target application D is 3600 seconds; then, a shortest push delay, obtained by comparison, is 30 seconds, and therefore, an acquired target push delay is 30 seconds.

Step S402. The push client sends the target push delay to a push server.

Step S403. The push server receives the target push delay sent by the push client.

Step S404. The push server acquires a first heartbeat signal control time corresponding to the target push delay. In a specific implementation, the acquiring a first heartbeat signal control time corresponding to the target push delay may include acquiring the first heartbeat signal control time according to a network standard, a push success rate, and the target push delay, where the first heartbeat signal control time is a longest heartbeat signal control time, corresponding to the target push delay, in a current network standard and when a preset push success rate is met.

The push success rate is statistical data that is pre-collected on different target applications by the push server in different network standards, where the data corresponds to a push delay and a heartbeat signal control time of a target application. For example, statistical data in the push server may be a chart, where, in this chart, a coordinate system is established by using the push delay and the heartbeat signal control time of the target application as a horizontal axis and a vertical axis respectively, and a corresponding coordinate point is the push success rate. When receiving the target push delay, the push server finds a corresponding longest heartbeat signal control time in the coordinate system according to the target push delay and a preset push success rate, and acquires the heartbeat signal control time as the first heartbeat signal control time. For example, a push delay of a target application A is 30 seconds, a push delay of a target application B is 45 seconds, a push delay of a target application C is 60 seconds, a target push delay corresponding to the target applications A, B, and C is 30 seconds, and a preset push success rate is 99.9%, a longest heartbeat signal control time corresponding to the push delay of 30 seconds and the push success rate of 99.9% is searched for in the chart, and the longest heartbeat signal control time of 60 seconds is found, and then, 60 seconds are determined as the first heartbeat signal control time.

Step S405. The push server sends the first heartbeat signal control time to the push client.

Step S406. The push client receives the first heartbeat signal control time returned by the push server.

Step S407. The push client sends a heartbeat signal to the push server at an interval of the first heartbeat signal control time. In a specific implementation, the heartbeat signal is sent to the push server at an interval of the first heartbeat signal control time, so as to maintain a connection. For example, according to a received first heartbeat signal control time of 60 seconds, a heartbeat signal is sent to the Push server at an interval of 60 seconds.

Step S408. Receive the heartbeat signal that is sent by the push client at an interval of the first heartbeat signal control time.

Step S409. If it is detected that the heartbeat signal fails to be sent, report a sending failure rate to the push server. In a specific implementation, in a heartbeat signal sending process, heartbeat signal sending may fail if the heartbeat signal is lost or times out, or heartbeat signal sending may also fail if a connection is disconnected due to poor network quality. When the heartbeat signal sending fails, the push client may receive a heartbeat signal sending failure response, and further detects the heartbeat signal sending failure.

Step S410. The push server acquires a second heartbeat signal control time that corresponds to the sending failure rate and the target push delay. In a specific implementation, the acquiring a second heartbeat signal control time that corresponds to the sending failure rate and the target push delay may include acquiring the second heartbeat signal control time according to a network standard, a push success rate, the sending failure rate, and the target push delay, where the second heartbeat signal control time is a longest heartbeat signal control time, corresponding to the sending failure rate and the target push delay, in a current network standard and when a preset push success rate is met.

The push success rate is statistical data that is pre-collected on different target applications by the push server in different network standards, where the data corresponds to a push delay and a heartbeat signal control time of a target application, and may be recorded and measured in a form of a chart. For example, for statistical data in the push server in the case of poor network quality, a coordinate system is established by using the push delay and the heartbeat signal control time of the target application as a horizontal axis and a vertical axis respectively, and a corresponding coordinate point is the push success rate. When receiving the target push delay, the push server finds a corresponding longest heartbeat signal control time in the coordinate system according to the target push delay and the preset push success rate; combined with the sending failure rate, multiplies the found heartbeat signal control time by a proportionality coefficient, where the proportionality coefficient is a preset proportionality coefficient corresponding to the sending failure rate, and a correspondence is as follows: a higher sending failure rate indicates a lower preset proportionality coefficient, and a lower sending failure rate indicates a higher preset proportionality coefficient; and multiplies the found heartbeat signal control time by the proportionality coefficient to obtain the second heartbeat signal control time, where the second heartbeat signal control time is shorter than the first heartbeat signal control time. For example, a push delay of a target application A is 30 seconds, a push delay of a target application B is 45 seconds, a push delay of a target application C is 60 seconds, a target push delay is 30 seconds, a preset push success rate is 99.9%, a corresponding first heartbeat signal control time found in the chart is 40 seconds, a received sending failure rate is 5%, and a corresponding preset proportionality coefficient is ¾; then, a second heartbeat signal control time is: 40*3/4=30 seconds.

It should be noted that this embodiment of the present invention does not limit a specific correspondence between the sending failure rate and the proportionality coefficient; a form of statistical data in the case of poor network quality and a form of statistical data in the case of normal network quality may be the same, but specific numeric values may be different; the form of the statistical data is not limited to a chart; and the statistical data may be updated periodically according to an actual situation.

Step S411. The push server sends the second heartbeat signal control time to the push client, where the second heartbeat signal control time is shorter than the first heartbeat signal control time.

Step S412. The push client receives the second heartbeat signal control time returned by the push server.

Step S413. The push client sends a heartbeat signal to the push server at an interval of the second heartbeat signal control time.

Step S414. The push server receives the heartbeat signal that is sent by the push client at an interval of the second heartbeat signal control time. In a specific implementation, the heartbeat signal that is sent by the push client at an interval of the second heartbeat signal control time is received, so as to maintain a connection, where the second heartbeat signal control time is a heartbeat signal control time that is re-adjusted after a previous heartbeat signal sending failure, thereby maintaining a Push connection and ensuring stability of the connection when heartbeat signal sending fails due to heartbeat signal loss or timeout, poor network quality, or the like.

According to the method for controlling sending of a heartbeat signal provided by this embodiment of the present invention, a first heartbeat signal control time may be determined according to an acquired target push delay corresponding to all target applications, and the first heartbeat signal control time may be adjusted according to a target application, so that a push client can send a heartbeat signal to a push server at an interval of the first heartbeat signal control time; and when heartbeat signal sending fails due to network quality, signal loss, or the like, the push client may further send a heartbeat signal to the Push server according to a received second heartbeat signal control time returned by the push server; further, a heartbeat signal control time may be adjusted according to network quality, or the like, thereby ensuring stability of a Push connection, and further improving timeliness of push message pushing, enhancing user experience, and effectively reducing power consumption and network data traffic.

Figure 5:
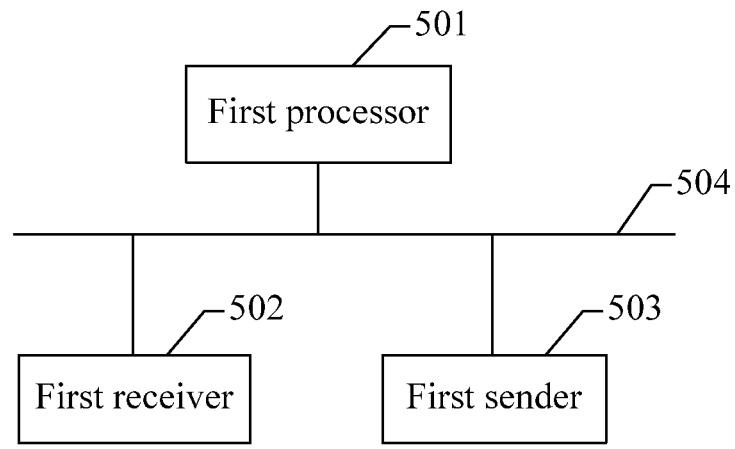
FIG. 5 is a schematic structural diagram of a terminal according to an embodiment of the present invention.

FIG. 5 is a schematic structural diagram of a terminal according to an embodiment of the present invention. As shown in FIG. 5, the terminal includes a first processor 501, a first receiver 502, and a first sender 503, and the terminal may be a push client, such as a mobile phone, a tablet computer, a digital television terminal, or a set top box.

The first processor 501 is configured to acquire a target push delay corresponding to all target applications.

The first sender 503, connected to the processor 501, is configured to send the target push delay to a push server.

The first receiver 502, connected to the first processor 501, is configured to receive a first heartbeat signal control time sent by the push server and corresponding to the target push delay.

The first processor 501 is further configured to send a heartbeat signal to the push server through the first sender at an interval of the first heartbeat signal control time.

Optionally, when acquiring the target push delay corresponding to all the target applications, the first processor 501 is configured to, if a quantity of all the target applications is one, acquire a push delay of the target application, and use the push delay of the target application as the target push delay; or if a quantity of all the target applications is at least two, acquire push delays of all the target applications, and use a shortest push delay in all the push delays as the target push delay.

Optionally, the first processor 501 is further configured to, after sending the heartbeat signal to the push server through the first sender at an interval of the first heartbeat signal control time, if detecting that the heartbeat signal fails to be sent, report a sending failure rate to the push server through the first sender; the first receiver 502 is further configured to receive a second heartbeat signal control time that is returned by the push server according to the sending failure rate and the target push delay, where the second heartbeat signal control time is shorter than the first heartbeat signal control time; and the first processor 501 is further configured to send a heartbeat signal to the push server through the first sender at an interval of the second heartbeat signal control time.

The processor 501 may be a central processing unit (CPU), an application-specific integrated circuit (ASIC), or the like. The terminal in this embodiment may further include a bus 504. The first processor 501, the first receiver 502, and the first sender 503 may be connected and communicate with each other by using the bus 504.

The terminal in this embodiment of the present invention may determine a first heartbeat signal control time according to an acquired target push delay corresponding to all target applications, and the first heartbeat signal control time may be adjusted according to a target application, so that a push client can send a heartbeat signal to a push server at an interval of the first heartbeat signal control time, so as to maintain a Push connection, thereby ensuring stability of the Push connection, improving timeliness of push information pushing, enhancing user experience, and effectively reducing power consumption and network data traffic.

Figure 6:
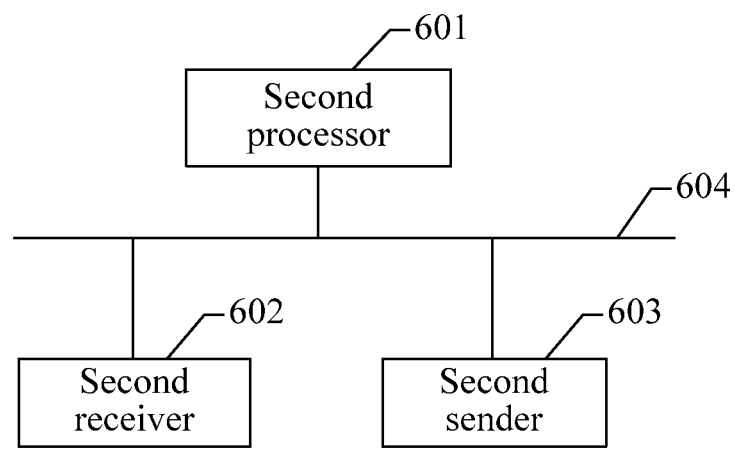
FIG. 6 is a schematic structural diagram of a server according to an embodiment of the present invention.

FIG. 6 is a schematic structural diagram of a server according to an embodiment of the present invention. As shown in FIG. 6, the server includes a second processor 601, a second receiver 602, and a second sender 603, where the second receiver 602 is configured to receive a target push delay sent by a push client and corresponding to all target applications; the second processor 601, connected to the second receiver 602, is configured to acquire a first heartbeat signal control time corresponding to the target push delay; and the second sender 603, connected to the second processor 601, is configured to send the first heartbeat signal control time to the push client, where the second receiver 602 is further configured to receive a heartbeat signal that is sent by the push client at an interval of the first heartbeat signal control time.

Optionally, the second receiver 602 is further configured to receive a sending failure rate that is reported by the push client after detecting that the heartbeat signal fails to be sent; the second processor 601 is further configured to acquire a second heartbeat signal control time that corresponds to the sending failure rate and the target push delay; the second sender 603 is further configured to send the second heartbeat signal control time to the push client, where the second heartbeat signal control time is shorter than the first heartbeat signal control time; and the second receiver 602 is further configured to receive a heartbeat signal that is sent by the push client at an interval of the second heartbeat signal control time.

Optionally, when acquiring the first heartbeat signal control time corresponding to the target push delay, the second processor 601 is configured to acquire the first heartbeat signal control time according to a network standard, a push success rate, and the target push delay, where the first heartbeat signal control time is a longest heartbeat signal control time, corresponding to the target push delay, in a current network standard and when a preset push success rate is met.

Optionally, when acquiring the second heartbeat signal control time that corresponds to the sending failure rate and the target push delay, the second processor 601 is configured to acquire the second heartbeat signal control time according to a network standard, a push success rate, the sending failure rate, and the target push delay, where the second heartbeat signal control time is a longest heartbeat signal control time, corresponding to the sending failure rate and the target push delay, in a current network standard and when a preset push success rate is met.

The second processor 601 may be a central processing unit, an ASIC, or the like. The server in this embodiment may further include a bus 604. The second processor 601, the second receiver 602, and the second sender 603 may be connected and communicate with each other by using the bus 604.

The server in this embodiment of the present invention may acquire a first heartbeat signal control time according to a received target push delay corresponding to all target applications, and the first heartbeat signal control time may be adjusted according to a target application, so that a heartbeat signal that is sent by a push client at an interval of the first heartbeat signal control time can be received, thereby ensuring stability of a Push connection, and further improving timeliness of push information pushing, enhancing user experience, and effectively reducing power consumption and network data traffic.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation. The computer-readable medium may include a random-access memory (RAM), a read-only memory (ROM), an electrically erasable programmable read-only memory (EEPROM), a compact disc read-only memory (CD-ROM), or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A method for controlling sending of a heartbeat signal, comprising:
    acquiring a target push delay corresponding to all target applications;
    sending the target push delay to a push server;
    receiving a first heartbeat signal control time sent by the push server and corresponding to the target push delay; and
    sending a heartbeat signal to the push server at an interval of the first heartbeat signal control time.

2. The method according to claim 1, wherein acquiring the target push delay corresponding to all target applications comprises:
    when a quantity of all the target applications is one, acquiring a push delay of the target application, and using the push delay of the target application as the target push delay; and
    when the quantity of all the target applications is at least two, acquiring push delays of all the target applications, and using a shortest push delay in all the push delays as the target push delay.

3. The method according to claim 2, wherein after sending the heartbeat signal to the push server at the interval of the first heartbeat signal control time, the method further comprises:
- reporting a sending failure rate to the push server when it is detected that the heartbeat signal fails to be sent;
- receiving a second heartbeat signal control time that is returned by the push server according to the sending failure rate and the target push delay, wherein the second heartbeat signal control time is shorter than the first heartbeat signal control time; and
- sending a heartbeat signal to the push server at an interval of the second heartbeat signal control time.

4. The method according to claim 1, wherein after sending the heartbeat signal to the push server at the interval of the first heartbeat signal control time, the method further comprises:
- reporting a sending failure rate to the push server when it is detected that the heartbeat signal fails to be sent;
- receiving a second heartbeat signal control time that is returned by the push server according to the sending failure rate and the target push delay, wherein the second heartbeat signal control time is shorter than the first heartbeat signal control time; and
- sending a heartbeat signal to the push server at an interval of the second heartbeat signal control time.

5. A method for controlling sending of a heartbeat signal, comprising:
- receiving a target push delay sent by a push client and corresponding to all target applications;
- acquiring a first heartbeat signal control time corresponding to the target push delay;
- sending the first heartbeat signal control time to the push client; and
- receiving a heartbeat signal that is sent by the push client at an interval of the first heartbeat signal control time.

6. The method according to claim 5, wherein after receiving the heartbeat signal that is sent by the push client at the interval of the first heartbeat signal control time, the method further comprises:
- receiving a sending failure rate that is reported by the push client after detecting that the heartbeat signal fails to be sent;
- acquiring a second heartbeat signal control time that corresponds to the sending failure rate and the target push delay;
- sending the second heartbeat signal control time to the push client, wherein the second heartbeat signal control time is shorter than the first heartbeat signal control time; and
- receiving a heartbeat signal that is sent by the push client at an interval of the second heartbeat signal control time.

7. The method according to claim 6, wherein acquiring the first heartbeat signal control time corresponding to the target push delay comprises: acquiring the first heartbeat signal control time according to a network standard, a push success rate, and the target push delay, wherein the first heartbeat signal control time is a longest heartbeat signal control time, corresponding to the target push delay, in a current network standard and when a preset push success rate is met.

8. The method according to claim 6, wherein acquiring the second heartbeat signal control time that corresponds to the sending failure rate and the target push delay comprises acquiring the second heartbeat signal control time according to a network standard, a push success rate, the sending failure rate, and the target push delay, wherein the second heartbeat signal control time is a longest heartbeat signal control time, corresponding to the sending failure rate and the target push delay, in a current network standard and when a preset push success rate is met.

9. The method according to claim 5, wherein acquiring the first heartbeat signal control time corresponding to the target push delay comprises acquiring the first heartbeat signal control time according to a network standard, a push success rate, and the target push delay, wherein the first heartbeat signal control time is a longest heartbeat signal control time, corresponding to the target push delay, in a current network standard and when a preset push success rate is met.

10. A terminal, comprising:
- a first processor;
- a first receiver; and
- a first sender,
- wherein the first processor is configured to acquire a target push delay corresponding to all target applications;
- wherein the first sender, connected to the first processor, is configured to send the target push delay to a push server,
- wherein the first receiver, connected to the first processor, is configured to receive a first heartbeat signal control time sent by the push server and corresponding to the target push delay, and
- wherein the first processor is further configured to send a heartbeat signal to the push server through the first sender at an interval of the first heartbeat signal control time.

11. The terminal according to claim 10, wherein when the first processor acquires the target push delay corresponding to all the target applications, the first processor is configured to:
- when a quantity of all the target applications is one, acquire a push delay of the target application, and use the push delay of the target application as the target push delay; and
- when the quantity of all the target applications is at least two, acquire push delays of all the target applications, and use a shortest push delay in all the push delays as the target push delay.

12. The terminal according to claim 11, wherein the first processor is further configured to, after sending the heartbeat signal to the push server through the first sender at an interval of the first heartbeat signal control time, when detecting that the heartbeat signal fails to be sent, report a sending failure rate to the push server through the first sender, wherein the first receiver is further configured to receive a second heartbeat signal control time that is returned by the push server according to the sending failure rate and the target push delay, wherein the second heartbeat signal control time is shorter than the first heartbeat signal control time, and wherein the first processor is further configured to send a heartbeat signal to the push server through the first sender at an interval of the second heartbeat signal control time.

13. The terminal according to claim 10, wherein the first processor is further configured to, after sending the heartbeat signal to the push server through the first sender at an interval of the first heartbeat signal control time, when detecting that the heartbeat signal fails to be sent, report a sending failure rate to the push server through the first sender, wherein the first receiver is further configured to receive a second heartbeat signal control time that is returned by the push server according to the sending failure rate and the target push delay, wherein the second heartbeat signal control time is shorter than the first heartbeat signal control time, and wherein the first processor is further configured to send a heartbeat signal to the push server through the first sender at an interval of the second heartbeat signal control time.

* * * * *